United States Patent [19]

Dinatale et al.

[11] Patent Number: 4,884,794
[45] Date of Patent: Dec. 5, 1989

[54] DUPLEX DOCUMENT HANDLER

[75] Inventors: Ernest L. Dinatale, Rochester; George J. Roller, Penfield, both of N.Y.

[73] Assignee: Xerox Corporation, Stamford, Conn.

[21] Appl. No.: 202,348

[22] Filed: Jun. 6, 1988

[51] Int. Cl.$^4$ .............................................. B65H 5/22
[52] U.S. Cl. ...................................... 271/3; 271/251; 271/291; 271/186; 271/902; 271/301; 355/24
[58] Field of Search ................ 271/3.1, 250, 251, 226, 271/301, 303, 186, 184, 291, 902, 3; 355/14 SH, 3 SH, 23, 24

[56] References Cited

U.S. PATENT DOCUMENTS

| | | | |
|---|---|---|---|
| 4,319,833 | 3/1982 | Hidding | 271/3.1 |
| 4,456,237 | 6/1984 | Buddenbeck | 271/301 |
| 4,579,444 | 4/1986 | Pinckney et al. | 355/3 SH |
| 4,621,108 | 11/1986 | Sanchez | 271/251 |
| 4,627,709 | 12/1986 | Kitajima et al. | 355/14 |
| 4,714,241 | 12/1987 | Randall | 271/3.1 |
| 4,727,398 | 2/1988 | Honjo et al. | 355/3 |
| 4,727,401 | 2/1988 | Partilla et al. | 355/14 |
| 4,744,553 | 5/1988 | Hirase | 271/3.1 |

FOREIGN PATENT DOCUMENTS

| | | |
|---|---|---|
| 0263398 | 9/1987 | European Pat. Off. . |
| 0268263 | 11/1987 | European Pat. Off. . |
| 3622187 | 1/1987 | Fed. Rep. of Germany ........ 355/24 |
| 2178411 | 2/1987 | United Kingdom . |

Primary Examiner—H. Grant Skaggs

[57] ABSTRACT

In a document handler in which simplex or duplex document sheets are fed from a document tray overlying the copier platen of a copier to one side of the platen, with a single inversion and a document side edge registration and deskewing system in the simplex path; a unidirectional, continous loop, but non-circular duplex document inversion path integral with and partially in common with the simplex path is provided at the same side of the platen. This duplex path has first and second inverting path segments separate from the simplex path, and a third path segment utilizing the simplex path. Duplex documents to be inverted are fed into the first path segment, which extends up from the platen outside of the simplex path and on through the second path segment to connect with the simplex path upstream of the side edge registration system and passing through the single inversion in the simplex path so that duplex documents being inverted are returned to the platen inverted from their previous orientation after re-registration by the same document side edge registration system as is used for simplex documents. A self-actuating platen edge guide, and two RDH modification versions, are also disclosed.

6 Claims, 5 Drawing Sheets

DUPLEX DOCUMENT HANDLER

The present invention relates to a document handling system for a copier and more particularly relates to an improved system for automatically feeding, inverting and edge registering duplex document sheets to be copied on a copier platen compatibly with feeding and edgeregistering simplex document sheets to be copied.

There is disclosed a dual mode (simplex or duplex document sheets), auto-duplex, document handler with a compact duplex document inverting path with substantial commonality between the duplex and simplex document paths and apparatus.

The subject document handler will be alternatively referred to as a "DADF" (duplex automatic document feeder) or "DADH" for convenience herein. However, as shown herein, with a low-cost modification, it can also provide a duplex recirculating document handler (DRDH).

The document inverting duplex path embodiment disclosed herein has an endless loop path extending from and back to the same side of the platen. This duplex document loop path is unidirectional and does not require any change in the direction of movement of the document, but accomplishes inversion of the duplex document so that both sides can be consecutively copied.

This disclosed embodiment has a contiguous, unidirectional, three inversions loop path for inverting the duplex documents in a small space at one side of the document handler. This disclosed inverting path may extend generally parallel to and outside of the simplex document path but connect into and utilize that simplex path and its registration system as part of the duplex document inversion path. As disclosed in this embodiment, the duplex path first adds two inversions and then utilizes the normal single inversion of the simplex path. Thereby a total of three inversions is provided, which returns the duplex document to the platen inverted from its preceding orientation on the platen.

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semi-automatic document handling (SADH), allowing an operator to "stream feed" originals into an input of the copier document handler or feeder, or to provide an automatic document handler (ADH) or feeder (ADF) for automatic feeding from a stack of documents, with the document handler providing all the deskewing, feeding and final registration of the documents into the copying position, and then ejecting the documents from the platen automatically.

A preferable document handling system is one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is desirable. It is also desirable that a document registration edge alignment or positioning system be available for such manual copying which is compatible with that used for or with the document handler.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being copied in the copier onto the "copy sheet", which may be abbreviated as the "copy". Related, e.g. page order, plural sheets of documents or copies are referred to as a "set". A "simplex" document or copy sheet is one having its image and page number on only one side or face of the sheet, whereas a "duplex" document or copy sheet has "pages", and normally images, on both sides, i. e., each duplex document and copy is considered to have two opposing sides, faces, or "pages" even though no physical page number may be present.

The present invention is suitable for either non-precollation or precollation copying. Precollation copying is automatically plurally recirculated document set copying provided by a recirculating document handling system or "RDH". With relatively minor changes, this may be provided as shown herein in FIGS. 6 & 7. However, the initially disclosed system of FIGS. 1–5 per se is for non-precollation (or post-collation) copying referred to as automatic document handling (ADH) as discussed above, in which the documents need only be fed and copied once.

Precollation, collation, recirculative, or RDH copying, as to is variably called, is a known feature for a copier, in which any desired number of collated copy sets or books may be made by making a corresponding number of recirculations of the set of documents in collated order past the copier imaging station and copying each document page (normally only once, or twice) each time it circulates over the imaging station. The copies therefrom automatically exit the copier processor in proper collated order as precollated copy sets, and thus do not require subsequent collation in a sorter or collator, as normally provided with an ADH.

However, a disadvantage of such precollation copying systems is that the documents must all be repeatedly separated and circulated for copying in a predetermined order a number of times equivalent to the desired number of copy sets. Thus, increased document handling is necessitated for a precollation copying system, as compared to a postcollation copying system. This may require more expensive separators and feeders to avoid document smearing or wear and for increased reliability.

In contrast, in a post-collation copying system, such as with an ADH or SADH, plural copies may be made at one time from each document page and post-collated by being placed in separate sorter bins of a copy output sorter. Thus the document set need only be manually or semiautomatically fed to the imaging station once (if the number of copy sets being made is less than the number of available sorter bins). A disadvantage is that the number of copy sets which can be made in one document set feed is limited by the number of available sorter bins. Also, a sorter adds space and complexity and is not well suited for on-line finishing. However, post-collation copying, or even manual document placement, is desirable in certain copying situations to reduce cost and complexity of the document handler, and/or minimize document handling, particularly for delicate, valuable, thick or irregular documents, or for a very large number of copy sets. Thus, it is desirable that a document handler for a precollation copying system be compatible with, and alternatively usable for, post-collation and manual copying as well.

In the Ricoh FT-7060 DADF, commercially introduced into the U.S. in 1985, an otherwise differing, but apparently 3 inversions per loop, duplex inversion path is used. In this Ricoh FT-7060 DADF the documents are sequentially fed from the bottom of a stack at one side of the platen directly, without any simplex path inversion, and presumably in 1-N order, across the platen, and are ejected from the other, opposite, side of the platen, without movement reversal. At that opposite side of the platen is an inverter gate with deflector pawls or fingers insertable into the document path of the document being ejected from that side of the platen. Simplex originals are fed directly out under this gate at that opposite side to a catch tray there, but duplex originals are diverted, by this gate being down, up into an inverter path, with a registration sensor therein. This gate is actuated in response to copier console switch selection of the desired copying mode. This inverter path is also unidirectional and appears to invert the documents therein three times and return them to the same (opposite) edge of the platen from which they were received into this inverter, for second side copying. However, this is a separate, dedicated, duplexing path not used for, or usable with, or shared with, simplex documents, and requiring separate drives, including a large inverting roller at one end of this inverting loop. No side edge registration is provided in this inverting loop. Furthermore, after the duplex documents are copied, they must be run through the duplex inverting loop again to reorder them for collated output stacking in this system.

In general, immediate inversion of a duplex document so that both sides can be consecutively copied is known to be desirable for certain copying modes. In particular, immediate inversion and copying of each duplex document can reduce the number of copies to be stored in the copier's duplex copy buffer tray as compared to a precollation copying system, or eliminate the duplexing buffer tray altogether.

In another DADH concept, documents are fed from the top of a stack overlaying the platen and fed as with one inversion through a simplex path to one end of the platen and across to a registration hard stop at the far end of the platen, then copied, reversed and fed back off through a gate at said one end up through an inside duplex path without inversion into the top of the simplex path, adjacent the stack feeder/separator, and then back down onto the platen. Thus, in this case, there is only one inversion in the whole duplex loop, i.e. the duplex document inversion path is substantially circular as in the IBM TDB cited hereinbelow. It is a simple, single direction, loop. The document may pass through the same ADF cross-roll side registration system in both simplex and duplex modes, in the same direction. After copying both sides the duplex document ejects from the far end of the platen. Feeding and copying order is 1-N, thereby requiring output inversion for collation. This is shown in a U.S. application, Ser. No. 146,181, filed Jan. 20, 1988, and entitled "Automatic Document Conveying Device for Original in a Two-Sided Copy Machine", based on FX/20656, Japanese Patent Application No. 62-247127, filed Feb. 6, 1987 and FX/20700, Japanese Patent Application No. 62-28177, filed Feb. 12, 1987.

Some current examples of prior art recirculating document handlers are disclosed in U.S. Pat. Nos. 4,076,408; 4,176,945; 4,278,344; 4,330,197, 4,466,733; and 4,428,667.

Of particular interest is the DADF disclosed in IBM TDB Vol. 14, No. 5, p. 1547, published October 1971. A more conventional duplex document inverter system with a circular inversion loop with only one inversion from and back to a platen is shown there; or in EK U.S. 4,714,241, issued Dec. 22, 1987; or in Koukai Gihoh Vol. 12-28, 87-8030, indicated as published July 20, 1987 (FX/21152).

Of particular interest re the subject duplex document copying order in particular, as well as it DADF configuration, is Canon U.S. 4,727,398 issued to T. Honjo et al Feb. 23, 1988, which bottom-feeds documents from one end of an over-platen tray and inverts and returns duplex documents at one side of the platen, but with a different duplexing inverting path. Another such reference is Canon 4,544,148 on a DADF with a similar document tray location but having a different document inverting path from that disclosed herein (see, e.g., FIG. 8); and Canon 4,723,772 issued Feb. 9, 1988 to T. Hohi, et al.

Cannon U.S. 4,627,709 issued Dec. 9, 1986 to T. Kitajima et al, in Col. 6 describes a flexible sheet Mylar TM deflector 37 adjacent original passage outlet 12 to help guide the reversed original to another adjacent passage 26. See FIGS. 2A, 8A or 13A. This is in an RDH configuration similar to the above cited Canon patents.

Also of interest is U.S. Pat. No. 4,456,237 issued June 26, 1984 to M. H. Buddendeck, particularly for its disclosure of a plural mode DADH/RDH with partially shared document paths with optional document reversal by reversible rollers 30 in the RDH document path.

Another reference on automatic duplex document handling for copiers is Xerox Corporation Reissue Pat. No. Re. 32,284 reissued Nov. 11, 1986 to Kalus K. Stange, Richard E. Smith, Thomas J. Hamlin and James R. Cassano, and the art cited therein.

The document side edge registration (cross-roller) system disclosed here is the same as that disclosed in Xerox Corporation U.S. Pat. No. 4,621,801 (D/83024), which corresponds to that in the Xerox Corporation "1065" copier automatic recirculating duplex document handling system.

Also noted is the upstream RDH inverter 40 disclosed in Xerox U.S. Pat. No. 4,278,344 (D/78008), for example.

The basic ADF shown herein, except for the duplex document capabilities, i.e., the simplex document path, but without any duplex document inverter, and a suitable copier, etc., is the subject of Xerox Corporation U.S. Pat. No. 4,727,401, issued Feb. 23, 1988 to S. R. Partilla and [the same] E. L. Dinatale (D/86035).

By way of further background description of a suitable copier with which this DADF (or DRDH) system may be used, there is noted Xerox Corporation U.S.

Pat. No. 4,708,462 on Dual Mode Duplexing issued to Denis J. Stemmle (D/84210D1). It discloses a copier which can select between immediate (direct loop path) duplexing or conventional duplex buffer tray (stack) duplexing, for optimizing duplex copying under various conditions (set size, sheet size, etc.).

Prior art re the additional disclosed feature of a pivotal platen edge unit which will pop up at the platen edge to provide a manual registration edge hard stop, with a vertical surface extending above the platen surface for the document, in the manual copying mode, when the ADF is lifted, includes, for example, Fuji Xerox U.S. Pat. No. 4,334,674; Ricoh U.S. Pat. No. 4,214,832, esp. FIGS. 11-12 & Col. 10, middle; Canon U.S. Pat. No. 4,281,919, e.g., FIGS. 10-12 & Col. 15, & claim 25 et al.; and Koni U.S. Pat. No. 4,344,703. U.S. Pat. No. 4,243,316 to Gustafson shows a pivotal registration gate 28 also of interest to the platen edge guide member and registration gate disclosed herein.

Although faster, more accurate, and automatic feeding into and registration of each document at the correct position on the platen to be copied is highly desired, this is difficult to accomplish without skewing (rotating) the document and/or damaging the edge of the document particularly as it is being stopped, and to provide side edge registration, as well as deskewing. One problem is that documents can vary widely in sheet size, weight, thickness, material, condition, humidity, age, etc.. Documents may even have curls, wrinkles, tears, "dog-ears", cut-outs, overlays, tape, paste-ups, punched holes, staples, adhesive or slippery areas, or other irregularities. Unlike sets of copy sheets, which generally are all from the same new clean batches and therefore of almost exactly the same condition and size, documents often vary considerably even if they are all of the same "standard" size, (e.g. letter size, legal size, A-4, B-4, etc.). In contrast documents even in the same set may have come from completely different paper batches or have variably changed size with different age or humidity conditions, etc.. Furthermore, the images on documents and their fusing can change the sheet feeding characteristics and these images may be subject to damage in feeding if not properly handled, e. g. smearing of fresh typewriting ink. Yet it is desirable to automatically or semi-automatically rapidly feed, register and copy even a mixture of sizes, types, and conditions of documents without document jams or document damage and with each document correctly and accurately aligned to a desired registration position.

One of the most difficult to achieve features for automatic document handling is the rapid, accurate, reliable, and safe registration of each document at the proper position for copying. Conventionally the document is desirable either center-registered or corner-registered (depending on the copier) by the document handler automatically at a preset registration position relative to the copier platen. At this registration position two orthogonal edges of the document are aligned with two physical or positional (imaginary) registration lines of the copier platen at which the original document is properly aligned with the copier optics and copy sheet/photoreceptor registration system for correct image transfer of the document image to the photoreceptor and then to the copy sheet. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents.

In preferred types of copying systems the document is registered for copying overlying a selected portion of full-sized (full-frame) platen which is at least as large as the largest document to be normally copied automatically. In such systems the document is preferably either scanned or flashed while it is held stationary on the platen in the desired registration position. That is, in these full-frame systems the document is preferably registered by being stopped and held during imaging at a preset position over the platen glass which is adjacent one side or edge thereof.

As shown in the art and discussed herein, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying, as well as registering the document.

However, lateral or second axis (side edge) document registration is known to preferably be done upstream of the platen. The present system desirably provides this with a single system for all copying modes.

Integral side or lateral registration together with side edge deskewing of the document is known to be highly desirable, particularly to avoid having to use mechanical lead edge hard stop deskewing. The present system provides this with a single system for all copying modes.

Since forward edge-registration by mechanical or "hard" stopping of the document edge against a mechanical edge, finger or gate is known to be undesirable, other systems have been developed. As shown in the cited U.S. Pat. No. 4,621,801, document registration can desirably be done without such mechanical document stops on the platen. This can be done by preregistering the document to a platen transport belt with an upstream, off platen, pre-registration document edge sensor, fingers or rollers, and then moving the document a known, preset, distance over the platen on the belt into registration, providing there is no slippage during this entire movement between the document and the belt, i.e., stopping the document platen transport after a preset time period or movement to stop the document on the platen. Various art thereon is cited in said U.S. Pat. No. 4,621,801.

Some examples of various other patents generally teaching known copier document handlers and copiers and control systems therefor, including document and paper path switches and counters, are U.S. Pat. Nos.: 4,054,380; 4,062,061; 4,076,408; 4,078,787; 4,099,860; 4,125,325; 4,132,401; 4,144,550; 1,158,500; 4,176,945; 4,179,215; 4,229,101; 4,278,344; 4,284,270; 4,335,949; and 4,428,666. Conventional simple software instructions in a copier's conventional microprocessor logic circuitry and software of document handler and copier control functions and logic, as taught by the above and other patents and various commercial copiers, are well known and preferred. However, it will be appreciated that the functions and controls described herein may be alternatively conventionally incorporated into a copier utilizing any other suitable or known simple software or hard-wired logic systems, switch controllers, et.. Suitable software for functions illustrated or described herein may vary depending on the particular microprocessor or microcomputer system utilized, of course, but will be already available to or readily programmable by those skilled in the art without experimentation from the descriptions and references provided herein.

As shown in the above-cited art, the control of exemplary document and copy sheet handling systems in copiers may be accomplished by conventionally actuating them by signals from the copier controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc.. The resultant controller signals may conventionally actuate various conventional electrical solenoid or cam-controlled sheet deflector fingers, motors or clutches in the copier in the selected steps or sequences as programmed. (Conventional sheet path sensors, switches and bail bars, connected to the controller, may be utilized for sensing and timing the positions of documents and copy sheets, as is well known in the art, and taught in the above and other patents and products. Known copying systems utilize such conventional microprocessor control circuitry with such connecting switches and sensors for counting and comparing the numbers of document and copy sheets as they are fed and circulated, keeping track of their general positions, counting the number of completed document set circulations and completed copies, etc. and thereby controlling the operation of the document and copy sheet feeders and inverters, etc..

It is a general feature of the system disclosed herein to provide various of the features, and to overcome various of the disadvantages and limitations, discussed above and in the cited references.

The present system can provide deskewing and side-registration of both simplex and duplex documents, and do so twice for both copying presentations with inversion of duplex documents, and with edge-registration of the document side edge upstream of the platen. This is fully compatible with non-slip, non-skewing, over-platen feeding and registration. 1. e, a measured stop forward registration system which does not require slip or skewing of the document relative to the document platen transport and does not require mechanical document stops in the document path.

A specific feature disclosed herein is to provide, in a dual mode auto-duplex document handler, in which simplex or duplex document sheets are fed from a document tray, overlying the platen of a copier, to the platen, and in which simplex documents are so fed downstream from said tray to one side of said platen through a simplex document feeding path, the improvement comprising:

a single inversion in said simplex path adjacent said one side of said platen;

a document side edge registration system in said simplex path;

duplex document inversion path means for providing a duplex document inversion path integral with and partially in common with said simplex path;

said duplex document inversion path having first and second path segments separate from said simplex path, and said simplex path forming a third path segment of said duplex document inversion path;

diverting means for diverting duplex documents to be inverted into said first path segment of said duplex document inversion path;

said duplex document inversion path first path segment extending up from said platen outside of said simplex path, further away from said paten than said simplex path, into said second duplex path segment;

said second duplex path segment connecting with, for feeding documents into, said simplex path, so connecting upstream of said document side edge registration system and upstream of said single inversion in said simplex path so that duplex documents diverted into said duplex document inversion path by said diverting means are returned to said platen inverted from their previous orientation on said platen after passing through said document side edge registration system and said single inversion in said simplex path.

Further features which may be provided by the system disclosed herein, individually or in combination, include a dual mode, auto-duplex, document handler:

wherein said duplex document inversion path is a unidirectional and partially folded loop path extending from and back to one side of said platen without document motion reversal, further including an inverting path means and document restacking tray means at this opposite side of said platen for restacking documents after they were copied in their original order;

wherein said duplex document inversion path first path segment has two inversions in addition to said single document inversion in said second, simplex path segment thereof, to provide a total of three inversions of duplex documents in said duplex document inversion path between the copying of the opposite sides of the duplex documents;

wherein the direction of feeding of duplex documents in said simplex path, including said document side edge registration system, is the same as said direction of feeding of simplex documents therein, so as to provide the same document side edge registration;

wherein said duplex document inversion path has means for slightly laterally shifting a document sheet therein a direction opposite to that provided by said document side edge registration system;

wherein said duplex document inversion path has two inversions in additional to said single document inversion in said simplex path portion thereof to provide a total of three inversions of duplex documents between the copying of the opposite sides thereof;

wherein said duplex document inversion path comprises an outer "C" shaped duplex path segment outside of but overlying and generally parallel to an inner "C" shaped simplex path segment, said two "C" shaped path segments smoothly transitioning via an oppositely facing reverse C-shaped path segment interconnection at the top ends of said two "C" shaped paths, and said two "C"

shaped paths merging at their bottom ends adjacent said one side of said platen edge at said duplex decision gate means; and/or wherein said duplex document inversion path comprises an outer "C" shaped duplex path segment outside of but overlying and generally parallel to an inner "C" shaped simplex path segment, said two "C" shaped path segments smoothly transitioning via an oppositely facing reverse C-shaped path segment interconnection at the top ends of said two "C" shaped paths, and said two "C" shaped paths merging at their bottom ends adjacent said one side of said platen edge at said duplex decision gate means; and/or wherein said duplex document inversion path is a unidirectional and partially folded loop path extending from and back to one side of said platen without document motion reversal.

Further disclosed features include optional restack path means for providing document recirculation for precollation copying by providing a document restack path to the top of the stack in said same document tray, and a solenoid actuated gate for deflecting documents into said restack path from adjacent the top of said duplex document inversion path, after said first path segment of said duplex path, whereby documents may be repeatedly recirculated for precollation copying by being fed through said simplex path to said platen to be copied, then reversed after copying to feed back through said first path segment of said duplex path and then through said restack path to said document tray, so that duplex documents may additionally be circulated through said full duplex path to provide inversion and proper page presentation order and, optionally:

still further including an additional optional document inverter and selector gate therefor in said first path segment of said duplex path, so that duplex documents need not be circulated through said full duplex path to provide inversion and proper page presentation order for said document recirculation for precollation copying.

All references cited herein, and their references, are incorporated by reference herein for appropriate teachings of additional or alternative details, features, and/or technical background.

Various of the above-mentioned and further features and advantages will be apparent form, but are not limited to, the following specific examples of applications of the invention. The following description of these exemplary embodiments include drawing figures (approximately to scale) wherein:

Figure 1:
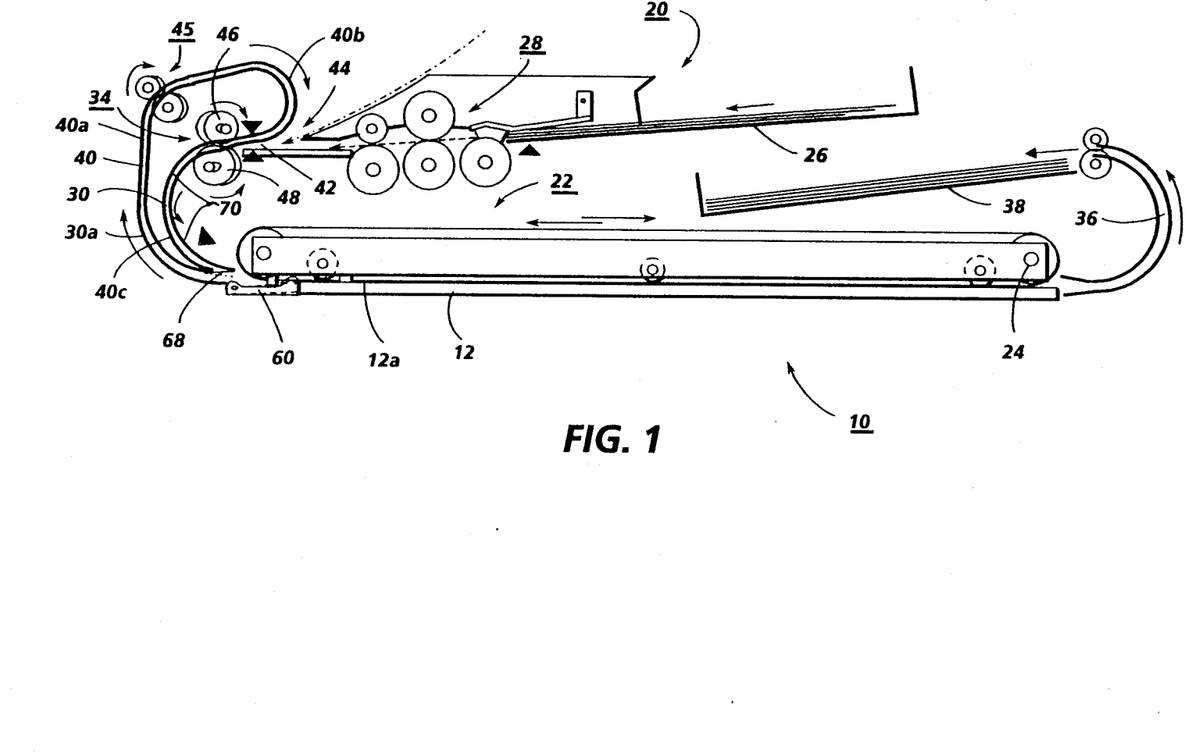
FIG. 1 is a partly schematic side view of an exemplary simplex/duplex document handler incorporating one example of the present invention.

Referring to the DADH example of FIG. 1 et al, it will be appreciated that the system described herein may be utilized with various other document handlers, and with almost any copier, including various of those incorporated by reference herein. Thus the only portion of an exemplary copier 10 which need be illustrated here is the copier platen 12.

Figure 6:
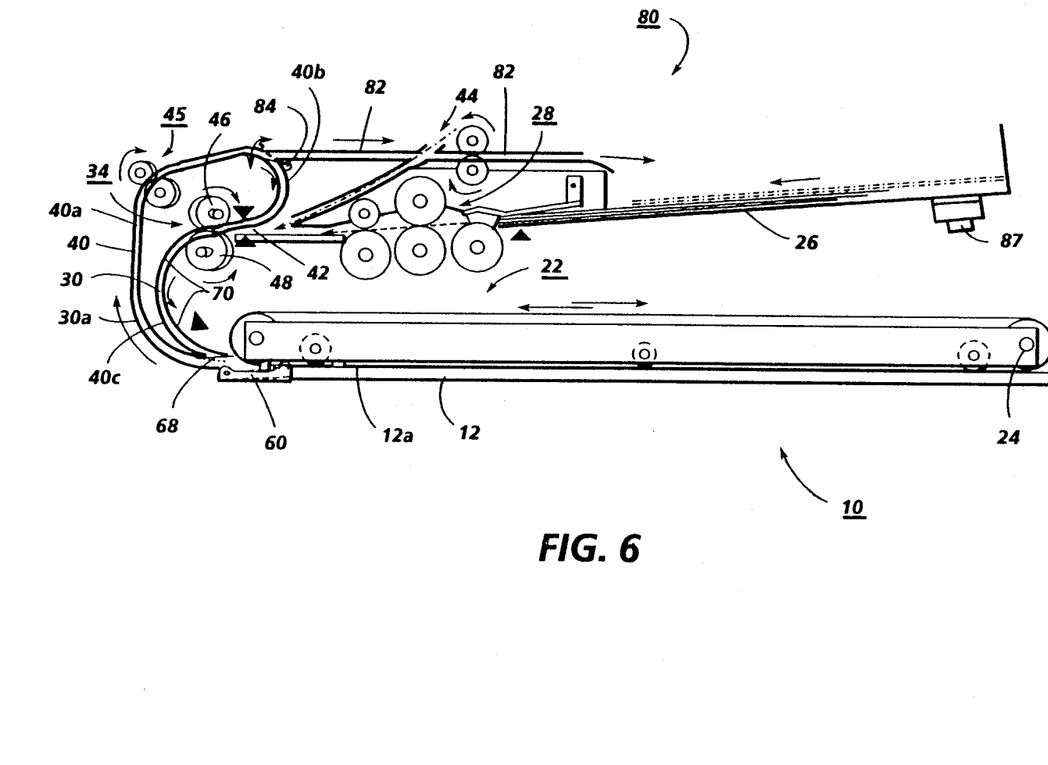
FIGS. 6 and 7 show respective RDH versions (modifications) of the DADH of FIGS. 1-5.
Figure 7:
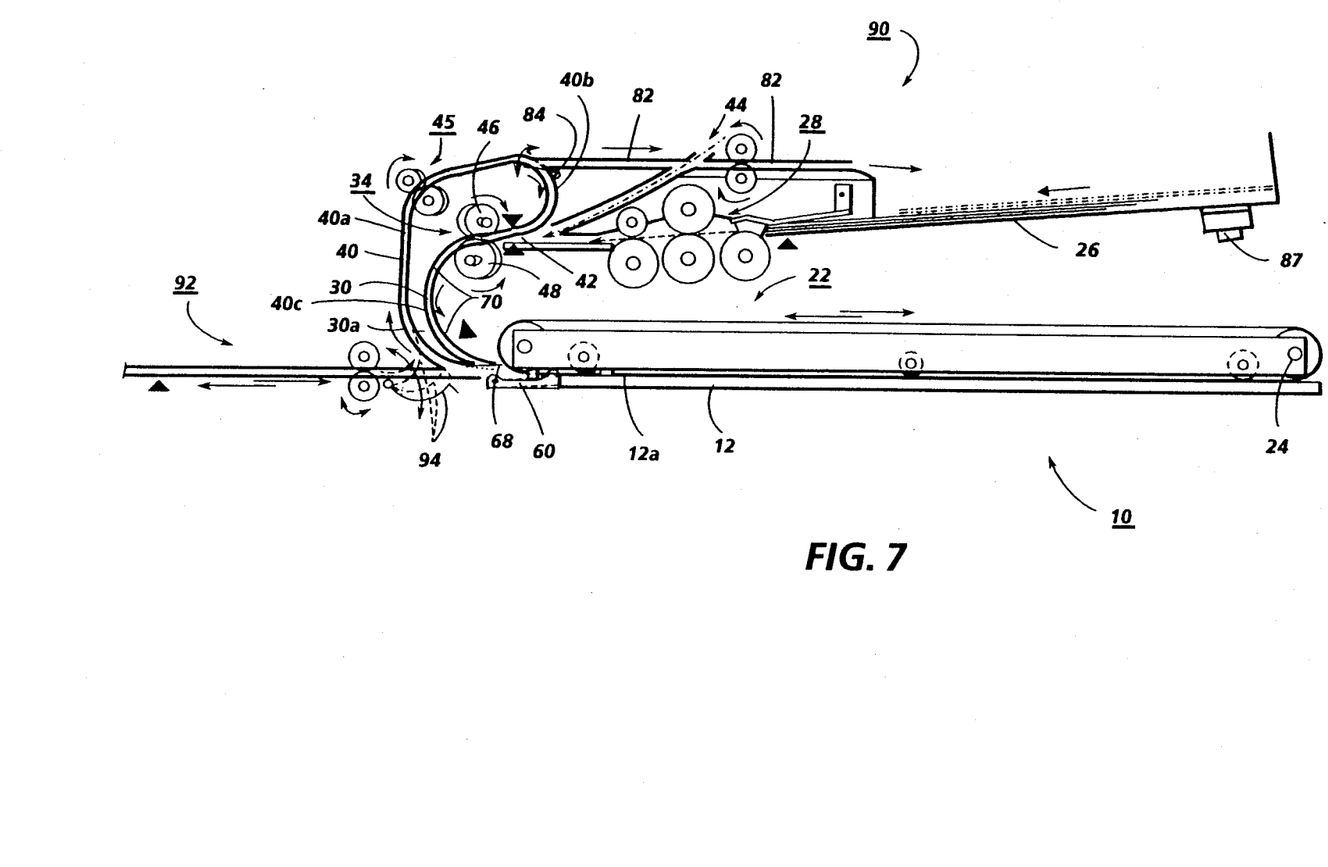

In the exemplary DADF system 20 disclosed here all modes of operation utilize the same trays and feeders, including platen document transport 22 and its drive (preferably comprising a stepper or servo motor 24 with encoder). Components may also be shared with an RDH mode of operation of this document handler, as shown in FIGS. 6 and 7. All documents to be copied by the copier 10 are sequentially fed to the platen 12 by the DADF 20 where they are driven over platen surface 12a into a desired copying registration position by the platen transport 22 with its drive 24, and then ejected by that belt transport system 22 from the platen 12. For all modes, including recirculating (precollation) document copying, the set of original documents may be initially loaded stacked face-up into the document tray 26. They are sequentially fed out from the bottom of the stack by a conventional sheet separator/feeder 28 in all modes.

Referring particularly to FIG. 1, all document sheets 27 are initially fed downstream from the tray 26 through a simplex path 30 to the acquisition entrance to the belt transport system 22, adjacent the platen 12. The tray 26 overlies the platen, and the path 30 conventionally provides the shortest possible path connection. The simplex path 30 has a single "C" shaped inversion inverting segment 30a. Thus the documents are turned over once before being presented to the platen. As will be described later herein, the initial portion of this simplex path 30, (just downstream of the separate/feeder 28, at the end of tray 28 and upstream of the inverting segment 3a) includes a side edges registration and deskewing system 34. As will be further described herein, this system 34 may be a known crossed-rolls edge guide system, for example, that described in the cited U.S. Pat. No. 4,621,801. However, this system can be a different type, for example, the system described in a copending commonly assigned application filed April, 1988 by Lam Wong (D/88005).

The DADH unit 20 may be utilized as a non-recirculating automatic document feeder (ADF) as in FIGS. 1–5 by placing the documents in tray 26 but not returning them to the tray 26 after copying, or by only circulating them once. After copying, documents in the ADF version of FIG. 1 may be ejected, as shown, from the opposite, downstream, end of the platen into an output inverting path 36 which inverts the documents and ejects them up into an output restacking tray 38. The tray 38 here is also spaced above the platen and the belt transport system 22, but is partially underlying the tray 26, for overall compactness of the DADF 20. The inverting path 36 provides restacking of the documents in the same collated order in which they were initially stacked in tray 26.

If the documents are duplex documents requiring inversion, they are inverted in a duplex path 40. The duplex path 40 here is a continuous unidirectional but non-circular loop which starts and ends at the same side of the platen. The duplex path 40 includes, in order, two inverting segments 40a and 40b and the single inversion inverting segment 30a of the simplex path 30. The duplex path 40 smoothly merges into the simplex path 30 at a path intersection 42 upstream of the edge registration and deskewing system 34 but downstream of the separator/feeder 28. At the intersection 42 each duplex document has been turned over twice from its orientation coming off the platen, and is feeding in the downstream direction into the simplex path 30, i.e., in the same feeding direction as a document being initially fed form the tray 26, as shown by the dashed arrow in FIG. 1. An alternate single sheet bypass input 44 may also be provided there as shown by the illustrated dot-dash arrow. All three said paths 30, 40, 44 are entering the side edge registration and deskewing system 34, and may also use the same sensor, shown there schematically as a solid diamond. All three paths are common at this point, and moving in a common direction into the edge registration and deskewing system 34. The system 34 here includes fixed-position cross-rolls 46 and 48 acting on the document sheet near one edge. Thus the same edge registration and deskewing mechanism and mode of operation, and then the rest of the simplex path 30, can be used for all modes of operation and all documents.

Desirably, as shown and further described herein, the duplex path 40 in segment 40a or 40b also includes a set of sheet feed rolls 45 oppositely skewed to drive the duplex documents therein sideways, but oppositely to the side registration movement direction of the side edge registration and deskewing system 34, as well as forward. Thus the duplex documents are provided an appropriate transverse entry position for entry into the side edge registration and deskewing system 34, and reduced edge drag.

A known duplex document copying sequence may be utilized. Note canon U.S. Pat. No. 4,727,398, cited above. If, for example, the stack of documents being copied is three duplex documents, these will be pages ½, ¾, 5/6, and the first document fed can be the bottom document 5/6. Side 5 will be fed face down at the platen first, through the common simplex path. But to provide 1-N order copying, the duplex document is preferably not copied at that point. It is removed and inverted and returned to the platen as described herein so that page 6 can be copied first. Then it may be inverted again in the same way to copy side 5. Then that document can be ejected and the next document fed and copied on both sides in the same manner. The cycle repeats until all duplex documents have been fed and copied.

Figure 4:
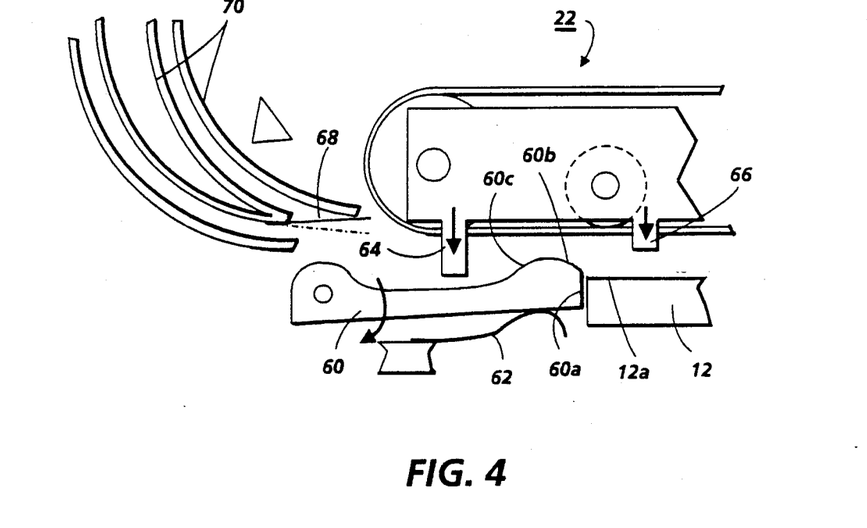
FIGS. 4 and 5 are exemplary enlarged side views of an exemplary platen edge guide system incorporated into the FIG. 1 DADH, shown in two positions.
Figure 5:
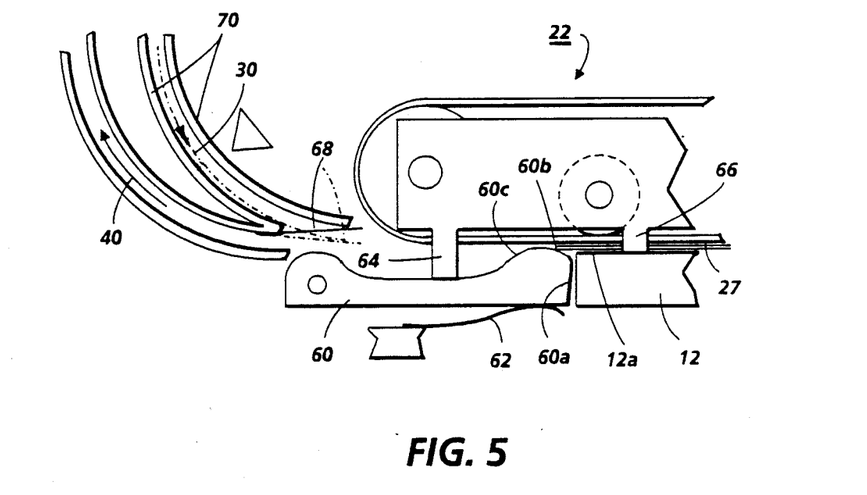

Turning now to FIGS. 4 and 5, an enlarged view of the end-of-platen-area is provided. A preferred additional pivotal edge guide feature is also better disclosed here, in two operating positions. FIG. 4 shows the DADF 20 being lifted away from the platen 12 to provide for manual document placement and copying on the platen. In this manual mode the DADF is disabled and one end of a pivotal platen edge guide unit 60 is automatically pivoted up by a a spring 62 to provide a manual document registration edge hard stop at 60a. This manual registration edge is provided here by a vertical surface 60a extending, in this mode, above the platen surface 12a directly adjacent the edge of the platen.

In contrast, FIG. 5 shows the DADF 20 latched down in its normal, operating, position, in which the platen transport 22 belt is closely overlying the platen. The DADF 20 operating position relative to the platen can be conventionally located or determined by the engagement of locating or stop pads 66 or the like with the outside edges of the platen or its surrounding copier support. In this mode the lowering of the DADF 20 has automatically pushed the pivotal platen edge guide unit 60 down into the position shown, by an engaging DADH 20 frame projection 64 or the like outside of the sheet path.

In this FIG. 5 DADF operating position the vertical surface 60a is pushed down below the platen surface 12a and therefore out of the document path. In this position only a smooth pyramid-shaped projection on the same end of the guide unit 60 is above the platen surface 12a. This pyramid shaped projection is formed by two oppositely sloped document ramp surfaces 60b and 60c, each at about 20-30 degrees angle from the horizontal, and both closely adjacent the edge of the platen. The ramp surface 60b engages and upwardly deflects the edge of a duplex document being fed back off the platen.

A thin flexible plastic baffle flap or automatic gate 68 prevents the reversed duplex document from entering the simplex path 30 outlet there, and deflects the document into the duplex path 40 entrance. For documents being fed onto the platen, which is always through the simplex path outlet, the document lead edge simply pushes the baffle or automatic gate 68 out of the way and then strikes the document ramp surface 60c. The ramp surface 60c engages and upwardly deflects the edges of the document just as it is being fed onto the platen, and thereby insures that it will not catch on the edge of the platen. The flap 68 acts as a one-way valve to prevent documents from entering the simplex path, and to guide them into the duplex path, during an inversion cycle.

To summarize, this pivotal platen edge unit 60 will automatically pop up at the platen edge to provide a manual registration edge hard stop with a vertical surface 60a extending above the platen document surface in the manual copying mode whenever the ADF is lifted. However this pivotal registration edge unit 60 is automatically pushed down so as to also provide two different functions in the ADF mode. The pivotal platen edge unit 60 has a smooth upstanding projection providing two cam or ramp surfaces 60b and 60c which extend above the conventional vertical manual registration surface 60a. This projecting part 60b and 60c of the pivotal platen edge unit 60 is not pushed below the plane of the platen surface 12a by the ADFF 20, only surface 60a is. No solenoid actuation is required. The ramp surface 60b allows documents to be fed back off over the edge guide 60 after copying without having to lower the unit 60 with a solenoid. I.e., in the document feeding modes this unit 60 is not functioning as a gate at all, but as a ramp, and no gate actuating mechanism is required. The opposing ramp surface 60c on the input side serves as a document input ramp to lift the documents up over the platen edge.

This two-sided cam surface 60b, 60c, type of configuration is of particular value to DH's which feed documents onto and off off the same side of the platen, as in this disclosed system, or as in the above-cited Canon U.S. Pat. Nos. 4,544,148, 4,579,327 or 4,637,709, or the generally corresponding Canon "7550" RDH. Documents can be fed past this platen registration edge guide in either direction without any solenoid retraction being required.

This edge-guide system 60 is compatible with various servo or stepper motor registration ADF's, i.e., with a document feed into position and stop type document registration system, which does not required a registration edge hard stop for non-manual document placements on the platen.

Turning to FIGS. 6 and 7, there are respectively shown RDH versions 80 and 90 of the DADE 20. While the general concept of converting an ADF into an RDH by adding a restack path back to the top of the stack in the same tray (here the input tray 26) is known per se, as shown in the art, this additional mode of operation may be provided and accomplished with very little hardware cost or modification in the DADF 20. In FIG. 6, an RDH 80 is provided merely by adding a short restack path 82, and a conventional solenoid actuated gate 84 deflecting documents into this restack path 82 from the top of the duplex path 40, after the inverting segment 40a and before the inverting segment 40b. Thus, simplex documents may be repeatedly recirculated for precollation copying by being fed in the normal manner through simplex path 30 to the platen to be copied, then reversed after copying to feed back through only the first part 40a of the duplex path 40 and then via the short restack path 82 back to the tray 26. Duplex documents may be recirculated in the same manner, except for additional sequential circulations through the full duplex path 40 to provided inversion and proper page presentation order, as described above.

With the addition of a restack path 82 as describe above, the output path 36 and output tray 38 may be eliminated altogether for any mode of operation.

Although the FIG. 6 RDH version 80 is satisfactory for low volume or infrequent duplex document use applications, the FIG. 7 RDH version 90 is capable of higher productivity duplex document copying. It additionally provides an additional gate 92 of a conventioal type with reversible rolls and an additional gate 94 for input/output to the inverter chute. This reduces the number of circulations of the duplex documents in this overall configuration. Here, this inverter 92 is located near the beginning of the duplex path 40, in the plane of the platen, over the top of the copier, as described in said U.S. Pat. Nos. 4,621,801, 4,579,362, or the like.

Note that the exemplary gate 94 at the entrance to the added inverter chute adjacent the duplex path 40a entrance in FIG. 7 is a curved 3position gate. It pivots into one of three positions: to allow sheet entrance to the inverter 92 chute (solid-line position); or to block entrance to inverter 92 and help deflect sheets into the duplex path 40; or (uppermost dashedline position) to act as a different deflector to deflect reversed sheets coming back out of the inverter 92 chute up into the duplex return path, i.e. to provide an inverter return path.

In both the FIGS. 6 and 7 RDH configurations of this duplex document feeder, the single optional gated return path 82 from the top of the duplex inverting loop path into the top of the document tray, at the same side, provides for optional recirculation of the document set at minimal additional cost. Only one inversion, by the first "C" shaped path segment 40a of the duplex inverter path 40, is used between the platen edge and the tray eject path 82. The simple gate 84 deflects the sheet horizontally into the short path 82, which preferably has conventional sheet eject rolls for appropriately ejecting the sheet into the tray 26 on top of the stack. But since that will not result in inversion of a duplex sheet upon its return to the platen (through the simplex path 20) the full inverter loop 40 may also be used in the FIG. 5 embodiment or the inverter 92 in the FIG. 6 embodiment.

In both the RDH versions 80 or 90, the same advantages of the DADF 20 are retained. That is, common path usage of the same single stack separator/feeder 28, the same edge-registration and deskewing system 34, and the same platen transport 22 and its forward edge registration drive system 24.

Particularly for RDH operation, a set separator and rear edge tamper and/or tray vibrator 87 may be additionally provided for restacking and set integrity maintenance.

In FIGS. 6 & 7, sheets initially fed through SADH slot path 44 may either output into the feed tray 26 or output into a catch tray such as 38, as shown in DADF version. An alternative, straight through feeding, SADH path may be provided by providing an SADH input at the right side of the platen and an SADH catch tray at the left side of the platen, or vice versa.

Referring to the described duplex systems in general, considerable commonality between the duplex and simplex document paths and their hardware is provided in all the disclosed document handler configurations herein. Little additional hardware is required for the added duplex capability. Auto duplex can be provided simply by adding a low cost compact inversion path to the basic simplex ADF configuration. This is provided in the disclosed examples of FIGS. 1–5 by only two baffles, one set of nip (sheet feed) rollers 45 and a flexible baffle 68 providing a self-actuating gate.

With this duplexing system, "immediate" duplexing can be done, not requiring a duplex buffer tray in the copier. However, regular duplexing can also be done, storing plural copies of the first side copies in the duplex buffer tray, as shown in the above-cited U.S. Pat. No. 4,708,462. Also, two documents can be placed on the platen at once with this system, which can be used for simplex/duplex copying, as taught in the above-cited U.S. Pat. No. 4,727,401.

The illustrated example of the duplex inversion loop path 40 here comprises an outer "C" shaped duplex path segment 40a outside of but overlying and generally parallel to the inner "C" shaped simplex path 30a, with path 40a smoothly transitioning with an oppositely facing C-shaped path segment 40b interconnection into path 30a at the top ends of said two "C" shaped paths, and with the two "C" shaped paths 40a, 30a merging at their bottom ends adjacent the platen edge.

The disclosed system feeds a duplex document from the platen, before or after it has been copied on one side, back up to, and then utilizes, the regular, simplex document, input sensor and input skewed cross-roller side registration system, and the entire simplex path back to the platen, and the same simplex forward registration system (a count from a trail edge sensor). Thereby there is a considerable savings in parts, i.e., the latter components all provide a dual-mode function. And a separate optional inverter path, at the opposite end of the platen, is not required. I.e., unlike the Xerox"1065" copier RDH of U.S. Pat. No. 4,621,801, for example, an opposite end of platen and opposite end of tray inverter path and a "racetrack" RDH path is not required. The duplex inverter path here in integral the feeding end of the document tray, but on the outside of the simplex path. Thus it is easily added on as a module. Furthermore, because the entrance to the duplex path is outside, not inside, the simplex path exit, a stationary baffle duplex path entrance can be used and no solenoid or other driven gate is required to direct documents into the duplex path vs the simplex path.

The additional feed rollers 45 in the duplex inverter path 40 can be driven by the same stepper motor, but preferably are oppositely skewed to initially move the returning duplex document sheet away from the side registration edge, by about 2 mm of side shift, to avoid edge drag in the duplex inversion path. Then the sheet is moved back into side registration when it is acquired by the regular input skewed cross-rollers and edge slot side edge registration system 34, here that of Xerox Corporation D/83024-U.S. Pat. No. 4,621,801.

Duplex documents may be stacked in normal order and orientation in the document input tray 26. They may be stacked, as shown, face up in normal 1 — N order from the top to bottom so that the feeding and copying order is N — 1. Here the document input tray 26 is conveniently located on top of the DADF unit.

To summarize, documents are sequentially fed from the bottom of the stack in tray 26 to the platen, in the same path for either simplex and duplex. That common path from the tray to the platen includes a single inversion, conventionally provided by a 180 degree baffled path turn 60a between the stack feeder 28 and one side of the platen. Adjacent the platen the document sheet is acquired by the platen transport belt system 22 and fed onto the platen to be copied. Then, in this system, for duplex documents, the belt is reversed to reverse-feed the document back off the same side of the platen. (After copying is completed the belt may continue to drive the document forward off the other side of the platen.) As the document is fed back off the same side of the platen, the document meets a deflector and baffle system and the duplex document is deflected up into the duplex return path, which is outside of the common path, and has two inversions, and returns the document back into the top of the common path just after the stack feeder/separator but ahead of (upstream of) the side registration system and the single inversion in that path, so that a total of three inversions plus side re-registration, are provided in the total loop path from the platen to the return back to the platen, thereby returning the document inverted from its previous orientation on the platen, and reregistered using the exact same registration system as for simplex. I.e., there is only one common deskew mechanism for all documents. Also, there is good throughput, especially in view of the short path lengths.

Conventionally, additionally connected to the copier controller are document sheet lead and/or trail edge sensors strategically positioned around the document path. An acquired document may be temporarily stopped at "wait" station position in the input path before it is transported onto the platen, i.e. to briefly wait for the completion of copying of the preceding document already on the platen.

Describing further the exemplary side edge registration and deskewing system 34 from U.S. Pat. No. 4,621,801, shown in FIGS. 2-3, in the operation of the document handler 20 all documents 27 fed from the tray 26 are initially inverted once, and deskewed, in semi-cylindrical first inversion sheet path baffles 70. These baffles 70 here include at one side or edge a corresponding large radius curved edge registration guide 72, illustrated in enlarged cross-section in FIG. 2. The edge guide 72 preferably contains an integral arcuate (semi-cylindrical) slot 74 with smooth generally parallel sides closely spaced from one another, (preferably substantially less than one centimeter) but spaced apart by a distance substantially greater than the thickness of the thickest document to be fed. A suitable such slot width is approximately 2.5 mm measured perpendicular to the document plane. The slot 74 depth to its bottom 76 is preferably greater. Approximately 15 mm has been found suitable. The bottom 76 of the slot 74 provides a smooth, low friction, surface against which one edge of each document sheet is deskewed and side-registered and slides along as it is being fed by deskewing rollers 48 and 46 through the arcuate baffles 70. That is, as the document is being fed away from the stack bottom feeder 28 to the nip between the platen surface 12a and the platen transport belt 22. The strict document control provided by the continuous confinement of the edge of the document being deskewed and side registered inside the slot 74 enables side registration to be done even though the document is being deformed.

Figure 2:
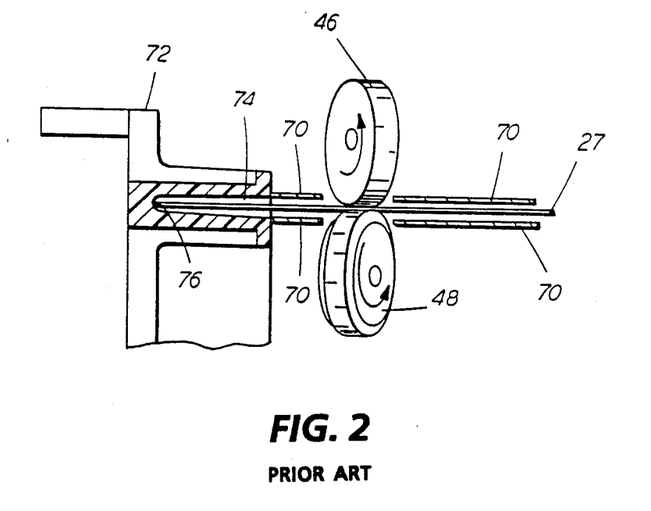
FIG. 2 is an enlarged and partially cross-sectional view of a portion of the DADH of FIG. 1 relating to an exemplary document side registration and deskewing system from U.S. Pat. No. 4,621,801 incorporated therein.
Figure 3:
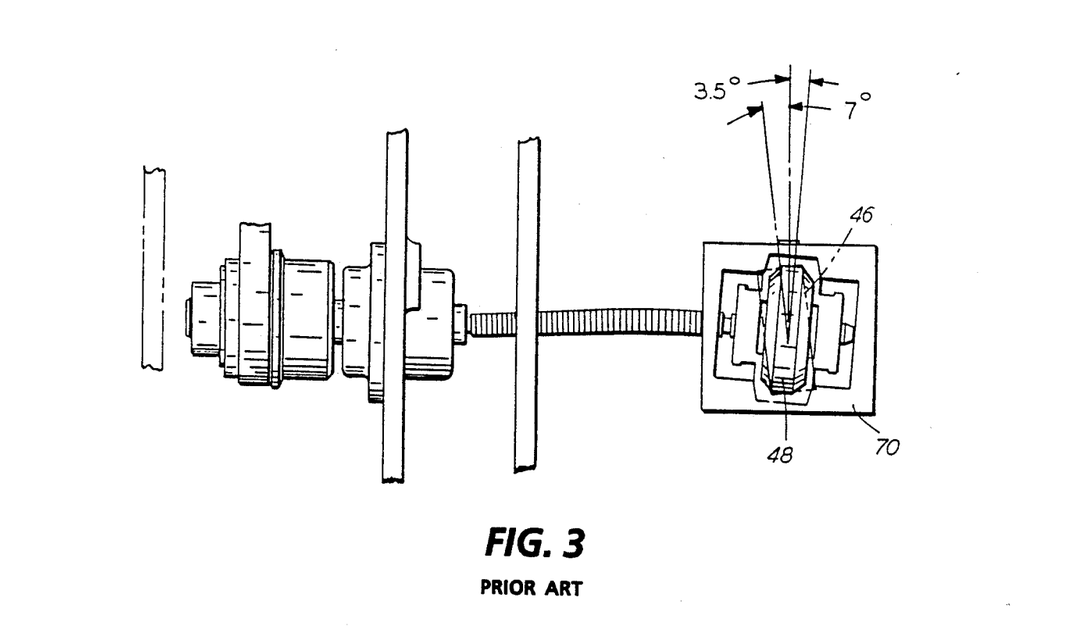
FIG. 3 is a partial top view of the side registration and deskewing roller system of FIG. 2 and its drive.

With this system, each document sheet is accurately side-registered only just before it is fed onto the platen 12, and each time it is fed or circulated. The document cannot skew or de-register before being immediately acquired by the non-slip platen transport. No on-platen side registration, or downstream side registration, or accurate restack registration is required. Likewise, all deskewing is accomplished in this same step, and lead edge deskewing is not required anywhere in this system. The platen transport need only provide for linear, non-skewing, feeding so as not to induce uncorrectably gross side mis-registration or skewing in the recirculation process. Since the platen transport 22 does not allow slippage of the document relative thereto, the upstream side registration and deskewing provided in this system is strictly maintained as the document is transported across the platen into the desired registration position. As noted, such a non-slip platen transport system is practical only with upstream deskewing of the document. Conventional on-platen deskewing against a mechanical registration edge is not practicable with a non-slip platen transport.

Discussing further this upstream side registration and deskewing system disclosed herein, particularly in FIGS. 2 and 3, and as further discussed in the above-cited U.S. Pat. No. 4,621,801, an appropriate limited sideways or lateral vector force component is induced in the document sheet by the different friction, and oppositely skewed, rollers 46 and 48. Here, these paired and nipped roller pairs preferably include a neoprene rubber or other relatively high friction driven roller 48 and a mating idler roller 46 of smooth stainless steel or the like. Here, the high friction driving roller 48 is preferably at an angle of approximately 3½ degrees toward the document side edge registration wall (the slot 74 bottom 76 in the edge guide 72). The opposing smooth low friction idler roller 46 is here skewed in the opposite direction, away from the edge guide 72, by approximately 7°. The lateral vector force component of feed wheel 48 continuously urges the edge of the document fully into the slot 74 until it is fully abutting the slot bottom 76, which edge registers and deskews that document sheet. The opposing skew roller 46 then assists the resistance of the slot bottom 76 to further attempted lateral document movement force by rollers 48. The slot bottom 76 is, of course, parallel the primary direction of document motion.

Because slot 74 and the rest of the baffles 70 are continuously arcuate, the document is likewise arcuately curved therein. This provides high beam strength. That is, the deskewing and side registration drive force by rollers 46 an 48 is at an area in which the document sheet beam strength has been maximized by the document being highly curved into a closely controlled semi-cylindrical configuration, which very greatly increases the resistance of the document sheet to wrinkling or buckling (and therefore jamming) during this edge registration and deskewing process. The close spacing of the opposite sides of the slot 74 prevents even flimsy sheets from wrinkling, waving or buckling from the forces deskewing them.

As long as the document sheet feeds through the rollers 46 and 48, they continuously maintain a constant urging of the document edge against the slot bottom 76. The document edge slides freely in slot 74 because the edge guide 72 (preferably a monolithic metal molding) provides a continuous slot 74 with smooth surfaces all extending continuously from the outlet of the stack feeder 28 to the inlet of the platen transport 22. Also, the slot 74 and the rest of the baffles 70 have a large radius (substantially greater than approximately 5 cm) and are not skewed. The inputs to the lost 74 preferably have smoothly flared (wider) openings to guide documents therein.

While the embodiments disclosed herein are preferred, it will be appreciated that they are merely examples, and that various alternatives, modifications, variations or improvements may be made by those skilled in the art from this teaching, which are intended to be encompassed by the following or subsequent claims:

What is claimed is:

1. In a dual mode auto-duplex document handler, in which simplex or duplex document sheets are fed from a document tray, generally overlying the platen of a copier, to the platen, and in which simplex documents are so fed downstream from said tray to one side of said platen through a simplex document feeding path, wherein said simplex path has a generally "C" shaped single inversion path section adjacent said one side of said platen, the improvement comprising:

a document side edge registration system system in said simplex path for laterally moving a document in a side registration direction;

duplex document inversion path means for providing a duplex document inversion path integral with and partially in common with said simplex path, which duplex document inversion path is a unidirectional and partially folded compact loop path extending from and back to one side of said platen;

said duplex document inversion path having first and second inverting path segments separate from said simplex path, and a third inverting path segment integral said simplex path single inversion path section, wherein said duplex document inversion path first provides two inversions of duplex documents in said first and second path segments and then connects with and feeds the duplex documents into said simplex path upstream of said single inversion path section so that a total of three inversions is provided for duplex documents by said duplex document inversion path, so that the duplex documents are returned to the platen inverted from their previous orientation on the platen;

wherein said first path segment of said duplex document inversion path is generally "C" shaped and extends generally parallel to, with the same facing direction as, and closely outside of, said simplex document path generally "C" shaped single inversion path section;

and wherein said second inverting path segment connets said first path segment into said simplex path upstream of said side edge registration system therein and upstream of said single inversion path section thereof, and so that the duplex documents are moving in the same direction as the simplex documents in said simplex path, and so as to provide the same document side edge registration lateral movement direction for duplex documents being inverted as for simplex documents;

and diverting means for selectively diverging duplex documents to be inverted into said first path segment of said duplex document inversion path;

so that duplex documents diverted into said duplex document inversion path by said diverting means are returned to said platen inverted from their previous orientation on said platen after passing through said first and second inverting path segments, said document side edge registration system, and said single inversion in said simplex path single inversion path section.

2. The dual mode auto-duplex document handler of claim 1 further including an inverting path means and document restacking tray means at the opposite side of said platen for restacking documents after they were copied in their original order.

3. The dual mode auto-duplex document handler of claim 1, wherein said duplex document inversion path has means for slightly laterally shifting a document sheet therein in a direction opposite to that provided by said document side edge registration system.

4. The dual mode auto-duplex documents handler of claim 1, further including optional restack path means for providing document recirculation for precollation copying by providing a document restrack path to the top of the stack in said same document tray, and a solenoid actuated gate for deflecting documents into said restack path from adjacent the top of said duplex document inversion path, after said first path segment of said duplex path, whereby documents may be repeatedly recirculated for precollation copying by being fed through said simplex path to said platen to be copied, then reversed after copying to feed back through said first path segment of said duplex path and then through said restack path to said document tray, so that duplex documents may additionally be circulated through said full duplex path to provide inversion and proper page presentation order.

5. The dual mode auto-duplex document handler of claim 4, further including and additional optional document inverter and selector gate therefore in said first path segment of said duplex path, so that duplex documents need not be circulated through said full duplex path to provide inversion and proper page presentation order for said document recirculation for precollation copying.

6. The dual mode auto-duplex document handler of claim 1, wherein said two "C" shaped paths (said first path segment of said duplex document inversion path and said single inversion path section of said simplex path) smoothly transition via said second inverting path segment, which comprises an oppositely facing reverse C-shaped path segment interconnecting the upper ends of said two "C" shaped paths, and wherein said two "C" shaped paths merge at their bottom ends adjacent said one side of said platen edge.

* * * * *